Dec. 5, 1950

C. C. MARTIN 2,533,025

APPARATUS FOR APPLYING TENSION
AND/OR PRESSURE TO MATERIAL

Filed July 19, 1945

INVENTOR.
Charles C. Martin,
BY William J. Wesseler,
ATTORNEY.

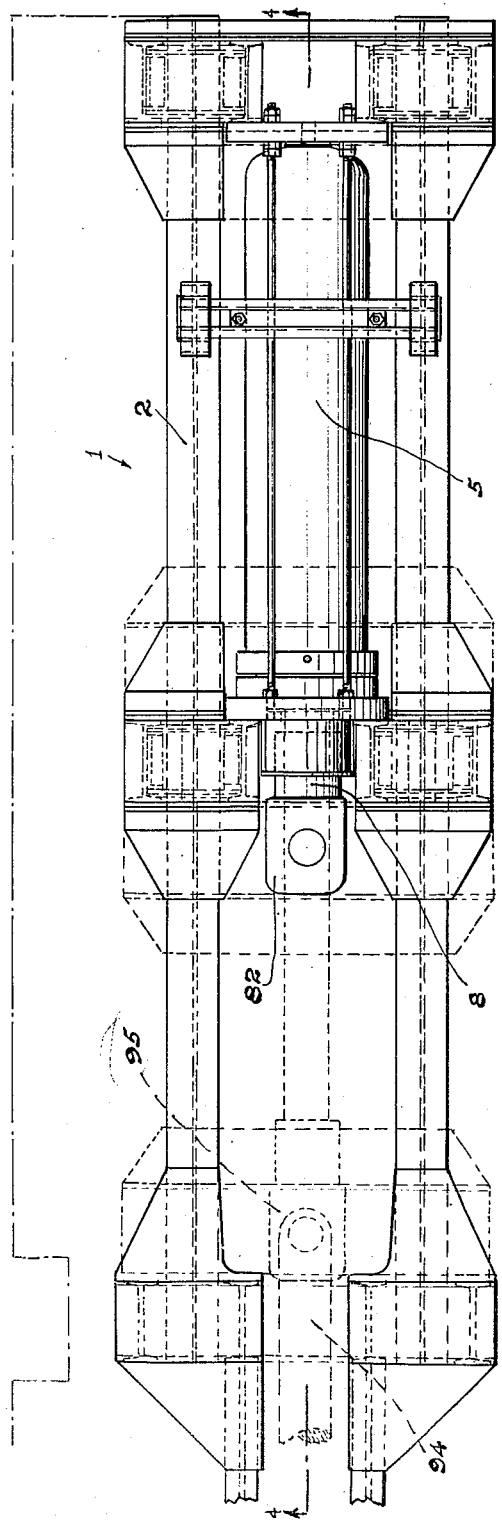
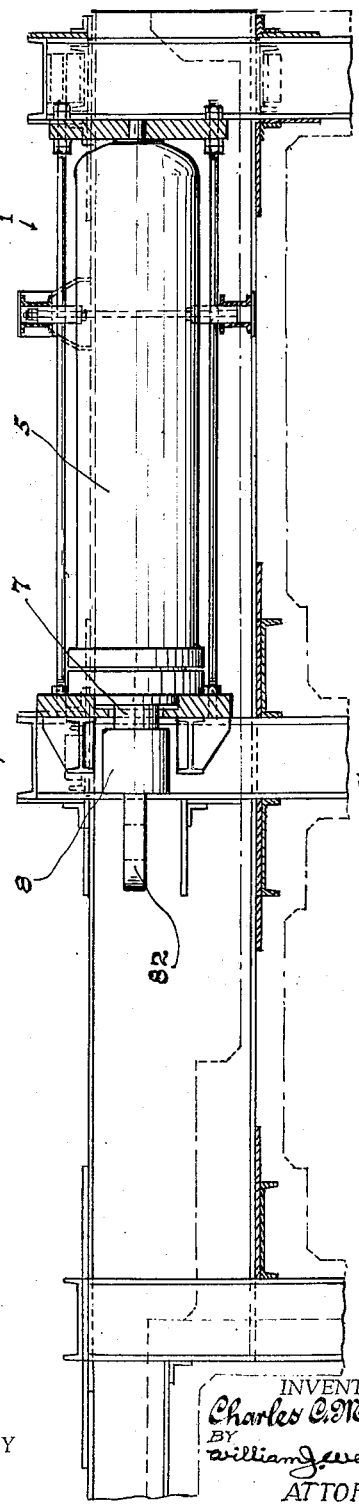

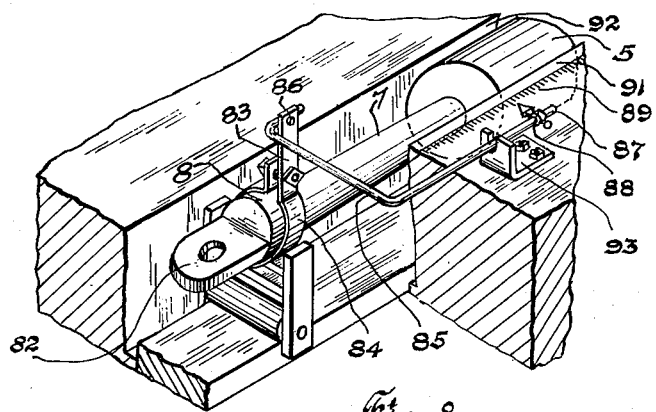
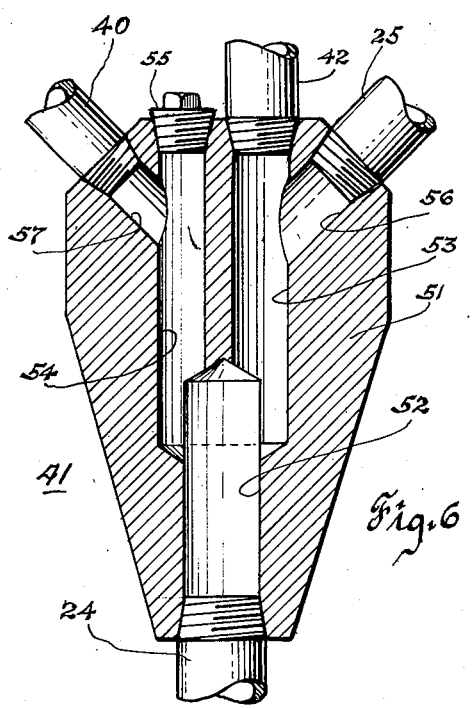
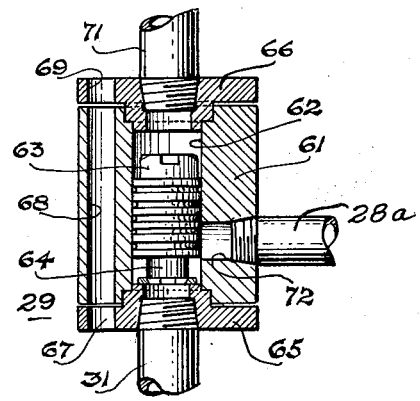
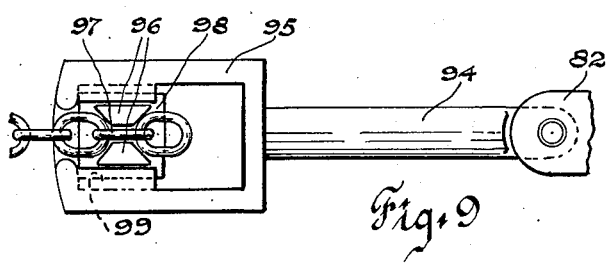

Patented Dec. 5, 1950

2,533,025

UNITED STATES PATENT OFFICE 2,533,025

APPARATUS FOR APPLYING TENSION AND/OR PRESSURE TO MATERIAL

Charles C. Martin, Cleveland Heights, Ohio, assignor to The Cleveland Chain and Manufacturing Company, Garfield Heights, Ohio, a corporation of Ohio Application July 19, 1945, Serial No. 605,864

7 Claims. (Cl. 73—97)

This invention relates to a testing apparatus. More particularly, it comprises an apparatus adapted to engage material and apply tension or pressure thereto under precision control. The invention includes sources of high and low pressure and means for combining same and for equalizing such pressures. It also includes governors and relief valves at critical points of the system wherein injury to any of such units will be avoided. The invention also has in view the elimination of back pressure in the system which would interfere with accurate readings as to the amount of power used in the making of the various tests.

The principal object of the present invention is to provide an improved testing apparatus adapted for applying force to various articles to be tested or to be modified in form or structure.

Another object of the invention is to provide an improved apparatus peculiarly adapted for the elongating and testing of heavy duty chains such as ships' anchor chains and the like, whereby uniformity of chain structure will result and wherein the various steps of applying an elongating force will be under precision control at all times.

Another object of the invention is to provide an improved apparatus adapted for testing and the like, wherein relatively high speed of operation may be carried on and wherein back pressures and fluid friction may be reduced to negligible factors as affecting the precision readings of the amount of power applied.

Another object of the invention is to provide an improved hydraulically operated testing machine with high and low pressure units and means for controlling and equalizing such pressures and eliminating back pressure and fluid friction as factors affecting the precision readings on the dials.

Another object of the invention is to provide an improved system of control for a hydraulic cylinder adapted for heavy duty wherein relief valves or safety governors are applied at all critical points and wherein full provision is made to eliminate back pressure at any point in the control system.

Another object of the invention is to provide a pair of four-way valves mutually interrelated so that dial pressure may be equalized on the recording instruments, and areas of fluid friction eliminated from the control system.

Other and further objects of the invention will appear in the course of the following description.

To the accomplishment of the foregoing and related ends, said invention consists of the means hereinafter fully described and particularly pointed out in the claims, the annexed drawings and the following description setting forth in detail certain structures embodying the invention, such disclosed means constituting, however, but several of various forms in which the principle of the invention may be used.

In said annexed drawings:

Fig. 3 is a plan view of the head frame and cylinder mounting of apparatus, enlarged;

Fig. 4 is a central longitudinal sectional view of the structure shown in Figure 3, taken along the line 4—4 thereof;

Fig. 6 is an enlarged vertical sectional view of the mixer chamber;

Fig. 7 is an enlarged vertical sectional view of the pressure equalizer unit;

Fig. 8 is a perspective view of the elongating indicator gauge; and

Fig. 9 is a fragmentary plan view of a chain anchorage member.

Figure 1:
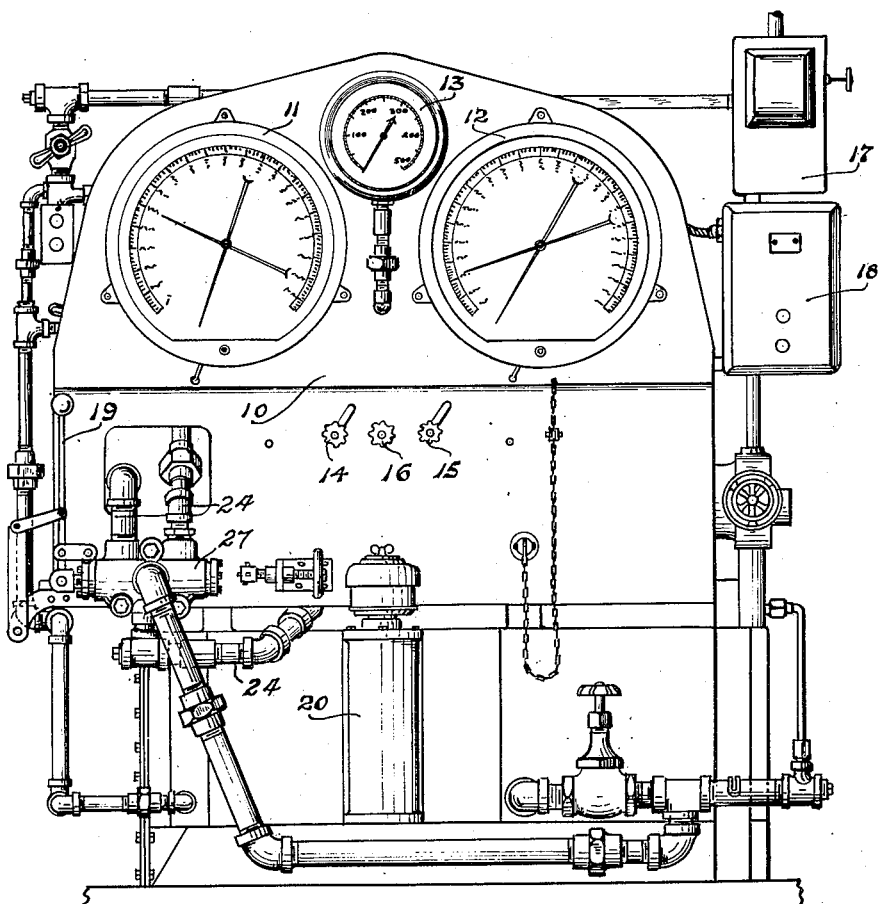
Fig. 1 is a front elevation showing the control indicator board of the apparatus.
Figure 2:
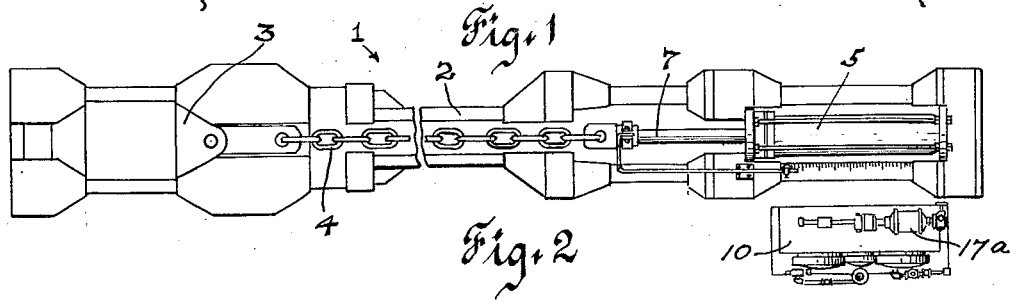
Fig. 2 is a diagrammatic plan view showing a testing channelway with the hydraulic cylinder and control indicator board embodying the principles of the invention.

As is clearly shown in the drawings, particularly in Figures 1 and 2, the apparatus provides a channelway 1 comprising a heavy rectangular elongated frame 2 within one end of which is an adjustable fixed cross-head or abutment 3 to which a chain length 4 or other objects to be elongated and tested may be attached, and the other end supporting a hydraulic cylinder 5 with a piston 6 connected to a piston rod 7 carrying a movable cross-head or abutment 8.

The cylinder 5 is connected to a hydraulic control and safety system 9. 10 indicates a control and indicator board, which carries a low range dial 11, a high range dial 12 and also a total pressure range dial 13 on its upper area; cut-off valves 14, 15 and 16 are provided for the respective dials just referred to. 17 indicates a switch for the circuit leading to a motor 17a and 18 indicates junction box for the current supply lines (not shown), the switch and box being mounted at the upper right-hand side of the control and indicator board. A throttle lever 19 is provided at the left-hand side of the apparatus for operating a valve and controlling the system. The lever 19 has three positions of control, for example, the inner position toward the right (as viewed in Fig. 5) the piston 6 is moved outwardly to apply pressure on the chain length, the central or neutral position in which the supply of pressure is cut off and toward the left wherein pressure on the chain length is relieved and the piston 6 is moved to its normal position. A filling tank 20 for the oil supply is provided centrally of the front lower area. The motor 17a is preferably mounted at the rearward side of the control and indicator board 10 in a central position driving a heavy duty compression pump 22 at one end of its axial shaft and a suction pump 23 at the opposite end of its shaft. In the system illustrated operating up to a pressure of 250 tons a high pressure pump of one and one-quarter gallons per minute has been used and a low pressure pump with a capacity of seventeen gallons per minute.

Figure 5:
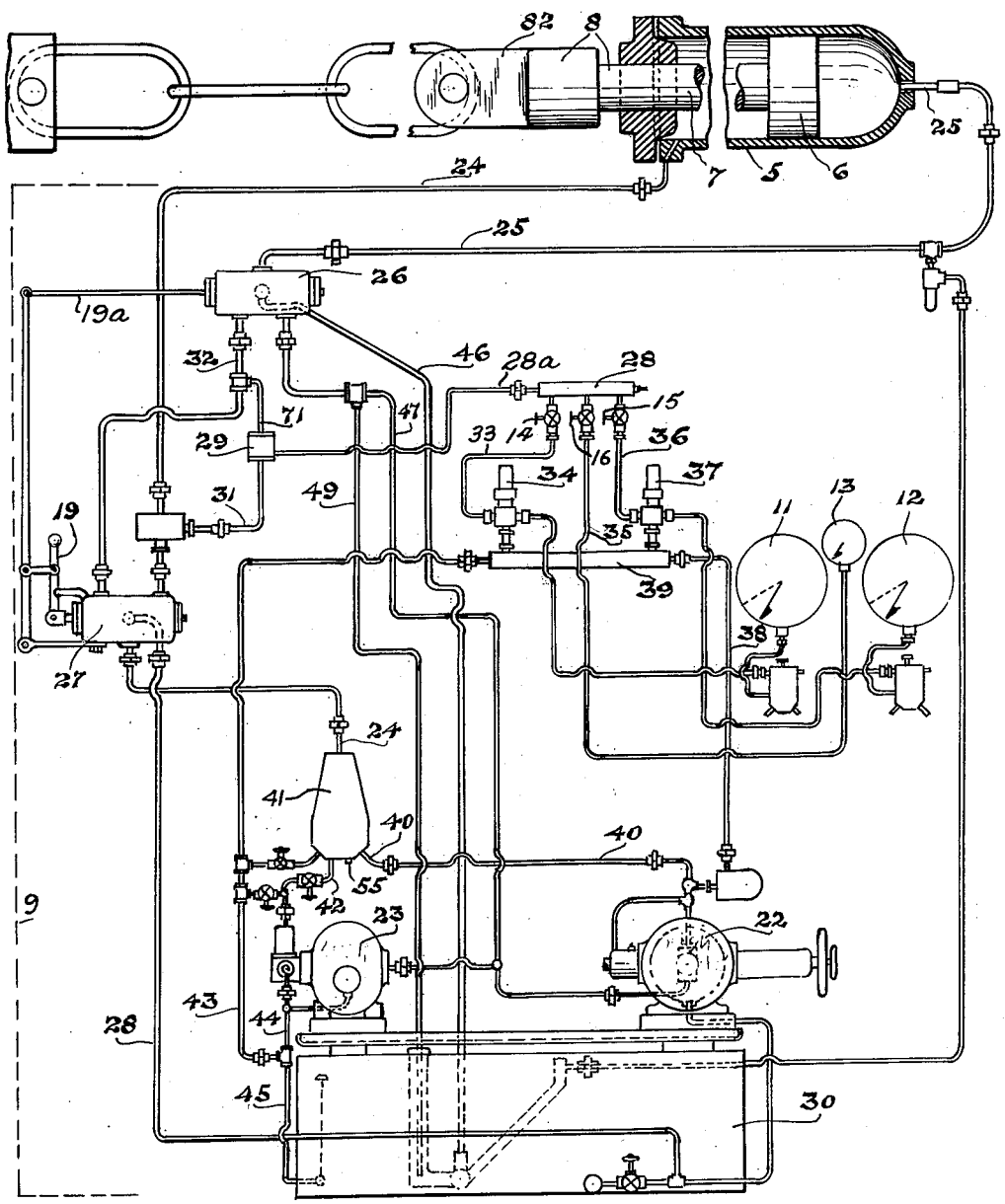
Fig. 5 is a diagrammatic view showing the cylinder and control system for the elongating and testing apparatus embodying the features of the invention, parts being broken away.

The construction and operation of the various parts will be best understood by reference to the diagrammatic view shown in Figure 5, wherein the cylinder 5 is connected with the control system 9 by the inlet high pressure line 24 at the forward end of the cylinder and also by the low pressure suction line 25 at the rearward end of the cylinder. The diagrammatic view shows the pressure cylinder 5 connected through the line 24 and a four-way throttle valve 27 with the low pressure pump 23 and through the line 28 with the storage tank 30 and also through the line 40 to the high pressure pump 22 which in turn is connected with the storage tank of oil 30. The pumps serve to exert pressure through the pressure line 24 against the piston 6 within the cylinder 5, and the suction side of the pumps is connected with the suction line 25 operating through a four-way valve 26 and line 47 with the intake side of the pumps 22, 23, to relieve back pressure on the rear side of the piston 6. The lever 19 is connected by linkage 19a with the four-way valve 26 so as to operate the valves 27 and 26 in synchronism, that is, when the levers 19, 19a, are moved to the right pressure is supplied from the pumps 22, 23, through a mixer 41 (later referred to) and line 24 to the inner side of the piston 6 and discharged from the rear side of the latter through valve 26 to the intake of pumps 22, 23, and when the levers 19, 19a, are moved to the left pressure is supplied by pumps 22, 23, through by-pass 32, and line 25 to the rear side of the piston 6 to move the latter to its normal position and liquid in the cylinder 5 is discharged through lines 24, 28, to tank 30. The pressure indication is carried to the dials through a manifold 28 connected by the line 28a with a pressure equalizer 29 positioned between the four-way valves 27 and 26, and connected through the line 31 with a high pressure line 24 on one side and with the back pressure lines 32, 71, on the other side.

The manifold 28 is connected through the pressure line 33 and through a relief valve 34 to the low range dial 11. The manifold 28 is also connected by a pressure line 35 to the full range dial 13 centrally of the instrument board, which dial is adapted to register the full tension of 250 tons. The manifold 28 is also connected by the pressure line 36 with the upper range dial 12. The line 36 is provided with a relief valve or governor 37. The relief valves 34 and 37 are connected by the line 38 through a manifold 39 with the pressure line 40 of the high pressure pump 22. As later set forth, the line 40 and a line 42 leading from the low pressure pump 23 discharges fluid into the mixer 41, so that the system receives high and low pressure oil from both pumps until the pressure range exceeds the capacity of the low pressure pump 23 when all increments of pressure are supplied by the high pressure pump 22. A line 43 returns fluid from the manifold 39 through the branch line 44 to the low pressure pump 23 and thence through the system to the high pressure line 24. Any excess of pressure passes through the branch line 45 to the oil storage tank 30.

A line 46 is provided to supply extra oil to the four-way valve 26 when required. The suction line of the four-way valve 26 returns to the pumps through the pipe 47 and also has a direct connection with the tank through the pipe 49.

The mixer 41 is illustrated in Figure 6 and comprises a body member 51 of solid material of somewhat pear shape, having a large drilled passageway 52 extending inwardly from one end to a point approximately midway where such passageway communicates with two drilled passageways 53, 54, spaced from each other and having a large area of communication with the passageway 52. The passageway 53 may be connected with the line 42, and the passageway 54 may be closed by a plug 55. The enlarged portion of the body is provided with passageways 56, 57, drilled at a downward inclination (as viewed in Fig. 6) toward the passageway 52 and intersecting, respectively, the passageways 53 and 54. The passageway 56 may be connected with the line 25 and the passageway 57 with the line 40. Thus, the mixing chamber may be readily fabricated and is adapted to withstand heavy pressures.

The equalizer mechanism 29 is illustrated in Figure 7 and comprises a body member 61 having a central passageway 62. The central cylindrical passageway 62 extends through the body member 61 and is adapted to receive a valve element 63 freely movable within the passageway 62 in response to the fluid pressures imposed upon the opposite ends thereof. The lower end of the piston rests against an adjustable support 64 connected with the fluid line 31 which is secured to the base of the body member by means of a plate 65 seated in a countersunk recess in the body member. At the upper end of the body member is an end plate 66 similar to the end plate 65 and seated in a countersunk recess at the adjacent end of the body member. The end plates and the body member are provided with a plurality of aligned passageways 67, 68, and 69 adapted to receive suitable bolts or other fastening members to firmly hold the end plates against the body member. The end plate 66 serves as a means for connecting the short fluid passageway 71 with the passageway 62. The body member is provided at a point spaced slightly above the member 64 with a transverse passageway 72, with which the fluid line 28a leading to the manifold 28 is connected. It will be noted that the valve element 63 prevents free passageway for fluid through the central passageway 62, but that under certain conditions of adjustment it will permit the passage of fluid from the fluid line 31 to the fluid line 28a thus equalizing the indications on the dials through the balancing of the pressures within the equalizing chamber. Thus violent fluctuations of the dial indicating pointers will be avoided, and precision readings may be readily made at any stage of the operation of the apparatus.

In addition to the readings obtainable through the dials, it is desirable to have a direct reading of the amount of elongation, or in some instances, of the amount of compression produced by the apparatus. One means of accomplishing this object is illustrated in Figure 8, wherein the piston rod 7 engaged within the cylinder 5 is provided adjacent its free end 82 with a bracket 83 having a clamp 84 at its lower end and with an indicator bar 85 secured at its upper end by means of a fastening element 86. The indicator bar is shown as being bent to right angles, and its free end 87 is provided with a pointer 88 movable over a series of graduations 89 provided on the margin 91 of a recess 92 formed in the supporting base of the apparatus for receiving the cylinder. A notched guide plate 93 is secured by suitable fastening elements to the base, and the pointer 88 will indicate with great precision the exact amount of elongation produced through the use of the apparatus.

The head 8 of the piston rod 7 is preferably not directly secured to the article to be tested, but as shown in Figure 9, is engaged therewith by means of an anchorage bar 94. Where heavy chain is to be tested, the anchorage bar may be provided at its free end with an enlarged box type clamping element 95 having a pair of jaws 96 between which a link 97 of the chain may be engaged, the adjacent links resting upon a plate 98 engageable within slideways 99 at each side of the box type clamping element.

The readings obtained on this apparatus are extremely accurate and the dials record the pressure with a minimum of oscillation of the indicating hands.

The apparatus herein set forth has been constructed and tested as a full size operative machine and the stretching or elongation of a chain length can be carried out with exceptional accuracy and with a fully dependable product.

Other modes of applying the principle of my invention may be employed instead of those explained, provided the means employed fall within the scope of the following claims.

I therefore particularly point out and distinctly claim as my invention:

1. An apparatus of the character described having in combination a frame structure providing a tensile testing and elongating channelway, a fixed abutment at one end of said channelway, a movable abutment associated with a hydraulic cylinder at the other end of said channelway, a piston within said cylinder connected with said movable abutment, and fluid pressure means arranged to act on one side of said piston for moving said movable abutment away from said fixed abutment, said fluid pressure means consisting of a source of high pressure fluid supply, a source of low pressure fluid supply, means for combining the supplied high and low pressure fluids, a fluid passageway between said combining means and one end of said cylinder for supplying the fluid thereto, the low pressure fluid serving to move the piston at high speed to the point of application of the high pressure fluid thereto, and a valve interposed in said passageway for controlling fluid flow therethrough.

2. An apparatus of the character described having in combination a frame structure providing a tensile testing and elongating channelway, a fixed abutment at one end of said channelway, a movable abutment associated with a hydraulic cylinder at the other end of said channelway, a piston within said cylinder connected with said movable abutment, and fluid pressure means arranged to act on one side of said piston for moving said movable abutment away from said fixed abutment, said fluid pressure means consisting of a fluid holding tank, a source of high pressure fluid supply connected with said tank, a source of low pressure fluid supply connected with said tank, means for combining the supplied high and low pressure fluids, a fluid passageway between said combining means and one end of said cylinder for supplying the fluid thereto, the low pressure fluid serving to move said piston at high speed to the point of application of the high pressure fluid, a valve interposed in said passageway for controlling fluid flow therethrough, a separate passageway between the opposite end of said cylinder and the intake sides of said sources of fluid pressure supplies, a separate valve in said separate passageway and operating connections between said valves arranged to simultaneously operate them in one direction to supply fluid pressure on one side of said piston to move said movable abutment away from said fixed abutment and relieve pressure on the opposite side of said piston, fluid connections between said valves, a discharge connection between said first mentioned valve and said tank, said operating connections being arranged to operate said valves in the opposite direction to reverse fluid flow to said cylinder, and connect said first mentioned valve to said separate valve and said tank.

3. An apparatus of the character described having in combination a fixed support and a movable support adapted to be engaged by the ends of an article to be tested or modified, a hydraulic cylinder provided with a piston connected to said movable support, a system of fluid passageways connected with the opposite ends of said hydraulic cylinder and adapted respectively to supply high and low pressure to said cylinder on opposite sides of said piston, a source of low pressure fluid for moving said piston at high speed to a point of application of high pressure to said piston, a source of high pressure fluid associated with said low pressure fluid, means for combining said high and low pressure fluids for moving said piston in one direction, and means for equalizing the pressures of the combined fluids over a portion of said system.

4. An apparatus of the character described having in combination a fixed support and a movable support adapted to be engaged by the ends of an article to be tested or modified, a hydraulic cylinder provided with a piston connected to said movable support, a system of fluid passageways connected with the opposite ends of said hydraulic cylinder and adapted respectively to supply high and low pressure to said cylinder on opposite sides of said piston, a source of low pressure fluid for moving said piston at high speed to a point of application of high pressure to said piston, a source of high pressure fluid associated with said low pressure fluid, means for combining said high and low pressure fluids for moving said piston in one direction, means for equalizing the pressures of the combined fluids over a portion of said system, and means for transferring said high pressure fluid to a source of liquid supply and said low pressure to the outer end of said cylinder to restore the supports to their original relative position.

5. An apparatus of the character described having in combination a fixed support and a movable support adapted to be engaged by the ends of an article to be tested or modified, a hydraulic cylinder provided with a piston connected to said movable support, a system of fluid passageways connected with the opposite ends of said hydraulic cylinder and adapted respectively to supply high and low pressure to said cylinder on opposite sides of said piston, a source of low pressure fluid for moving said piston at high speed to a point of application of high pressure to said piston, a source of high pressure fluid associated with said low pressure fluid, means for combining said high and low pressure fluids for moving said piston in one direction, indicating means to show the degree of pressure applied within said cylinder, means for equalizing the pressures of the combined fluids over a portion of said system, including said indicating means, and means for transferring said high pressure fluid from a source of liquid supply and said low pressure to the outer end of said cylinder to restore the supports to their original relative position.

6. An apparatus of the character described having in combination a fixed support and a movable support adapted to be engaged by the ends of an article to be tested or modified, a hydraulic cylinder provided with a piston connected to said movable support, a system of fluid passageways connected with the opposite ends of said hydraulic cylinder and adapted respectively to supply high and low pressure to said cylinder on opposite sides of said piston, a source of low pressure fluid for moving said piston at high speed to a point of application of high pressure to said piston, a source of high pressure fluid associated with said low pressure fluid, means for combining said high and low pressure fluids for moving said piston in one direction, indicating means to show the degree of elongation, means for equalizing the pressures of the combined fluids over a portion of said system, and means for transferring said high pressure fluid to a source of liquid supply and said low pressure to the outer end of said cylinder to restore the supports to their original relative position.

7. An apparatus of the character described having in combination a fixed support and a movable support adapted to be engaged by the ends of an article to be tested or modified, a hydraulic cylinder provided with a piston connected to said movable support, a system of fluid passageways connected with the opposite ends of said hydraulic cylinder and adapted respectively to supply high and low pressure to said cylinder on opposite sides of said piston, a source of low pressure fluid for moving said piston at high speed to a point of application of high pressure to said piston, a source of high pressure fluid associated with said low pressure fluid, means for combining said high and low pressure fluids for moving said piston in one direction, means for equalizing the pressures of the combined fluids over a portion of said system, and valves for controlling the supply of fluid pressure to the opposite sides of said piston.

CHARLES C. MARTIN.

REFERENCES CITED

The following references are of record in the file of this patent:

UNITED STATES PATENTS

| Number | Name | Date |
|---|---|---|
| 212,734 | Olsen | Feb. 25, 1879 |
| 2,187,914 | Reitan | Jan. 23, 1940 |
| 2,386,989 | Summers | Oct. 16, 1945 |

FOREIGN PATENTS

| Number | Country | Date |
|---|---|---|
| 149,787 | Great Britain | Aug. 23, 1920 |
| 826,900 | France | Jan. 18, 1938 |